Figure 1:
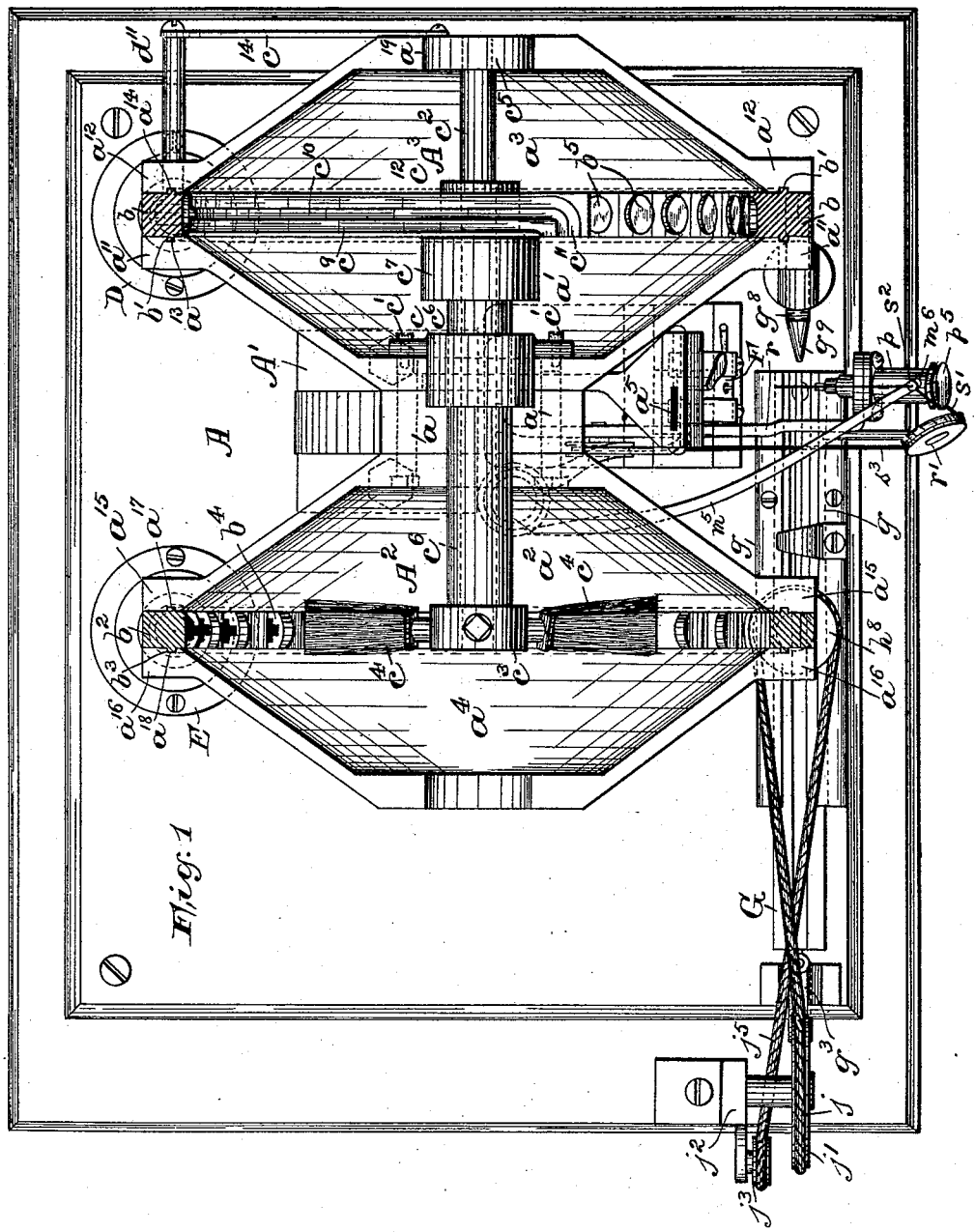

(No Model.) 12 Sheets—Sheet 1.

C. RADCLIFFE.
BUTTON ATTACHING MACHINE.

No. 486,895. Patented Nov. 29, 1892.

WITNESSES:
W. B. Fraentzel
Wm. H. Camfield, Jr.

INVENTOR
Charles Radcliffe,
BY Fred'k C. Fraentzel, ATT'Y.

(No Model.)  12 Sheets—Sheet 3.

C. RADCLIFFE.
BUTTON ATTACHING MACHINE.

No. 486,895. Patented Nov. 29, 1892.

WITNESSES:
W. B. Fraentzel.
Wm. H. Canfield Jr.

INVENTOR:
Charles Radcliffe,
BY Fred'k C. Fraentzel, ATT'Y.

(No Model.) 12 Sheets—Sheet 6.

C. RADCLIFFE.
BUTTON ATTACHING MACHINE.

No. 486,895. Patented Nov. 29, 1892.

WITNESSES:
W. B. Fraentzel.
Wm. H. Canfield Jr.

INVENTOR:
Charles Radcliffe,
BY Fred C. Fraentzel, ATT'Y.

(No Model.) 12 Sheets—Sheet 7.

C. RADCLIFFE.
BUTTON ATTACHING MACHINE.

No. 486,895. Patented Nov. 29, 1892.

WITNESSES:
W. B. Fraentzel
Wm. H. Canfield Jr.

INVENTOR:
Charles Radcliffe,
BY Fred C. Fraentzel, ATT'Y.

(No Model.) 12 Sheets—Sheet 8.

C. RADCLIFFE.
BUTTON ATTACHING MACHINE.

No. 486,895. Patented Nov. 29, 1892.

WITNESSES:
W. B. Fraentzel
Wm. H. Canfield, Jr.

INVENTOR:
Charles Radcliffe
BY Fred C. Fraentzel, ATT'Y.

(No Model.) 12 Sheets—Sheet 9.

C. RADCLIFFE.
BUTTON ATTACHING MACHINE.

No. 486,895. Patented Nov. 29, 1892.

WITNESSES:
W. B. Fraentzel
Wm. H. Canfield, Jr.

INVENTOR:
Charles Radcliffe,
BY Fred'k C. Fraentzel, ATT'Y.

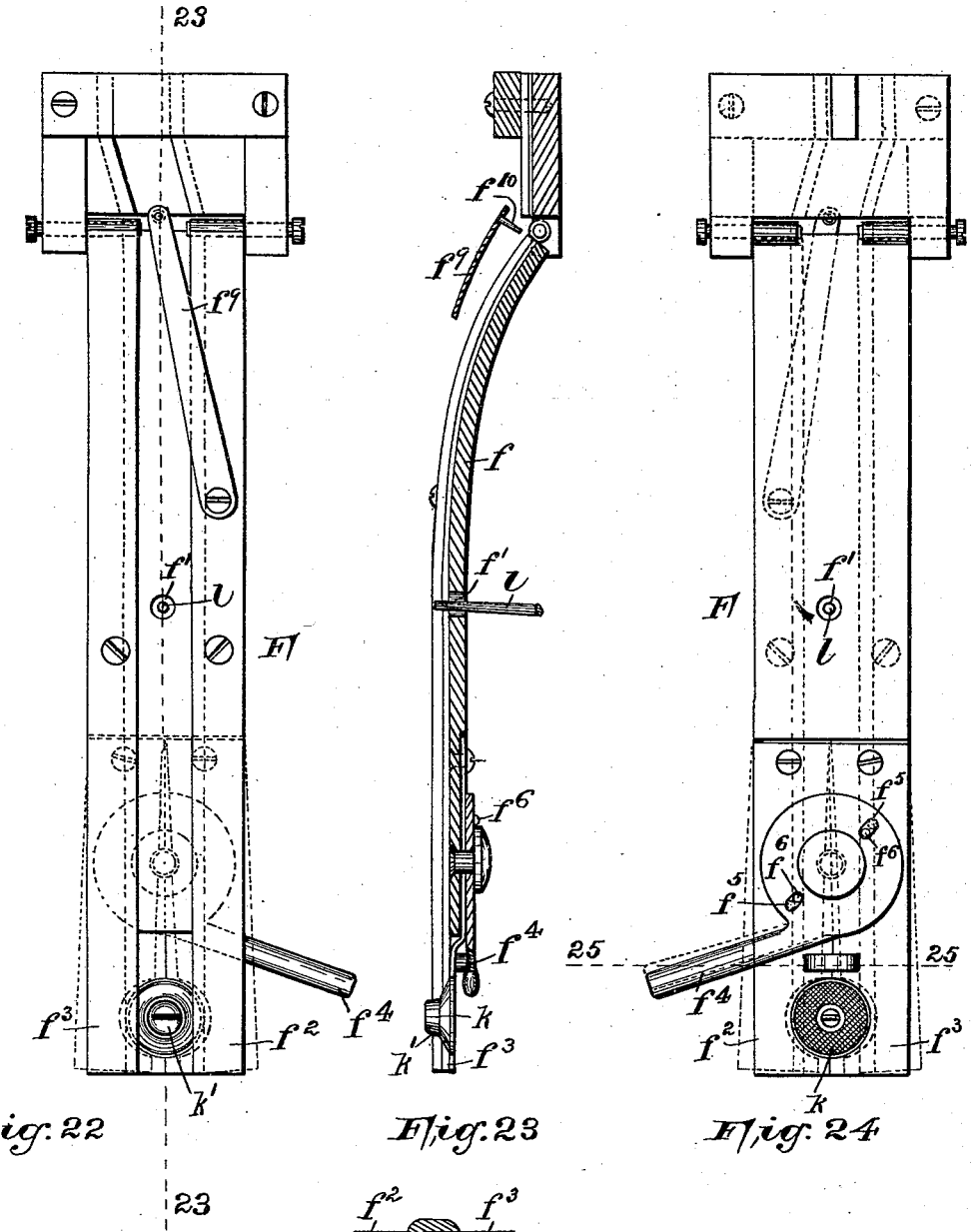

(No Model.) 12 Sheets—Sheet 11.
C. RADCLIFFE.
BUTTON ATTACHING MACHINE.

No. 486,895. Patented Nov. 29, 1892.

WITNESSES:
W. B. Fraentzel.
Wm. H. Canfield, Jr.

INVENTOR:
Charles Radcliffe,
BY Fred'k C. Fraentzel, ATT'Y.

(No Model.) 12 Sheets—Sheet 12.
C. RADCLIFFE.
BUTTON ATTACHING MACHINE.
No. 486,895. Patented Nov. 29, 1892.
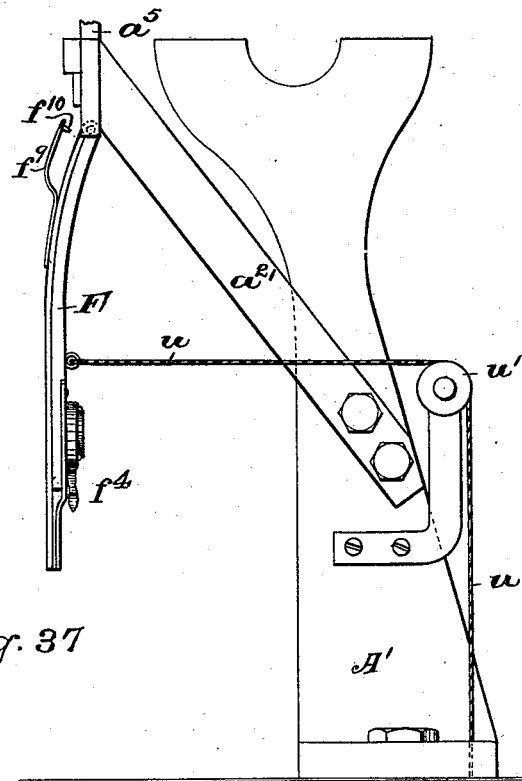
Fig. 37
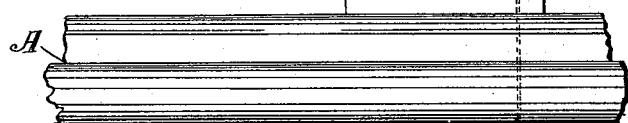
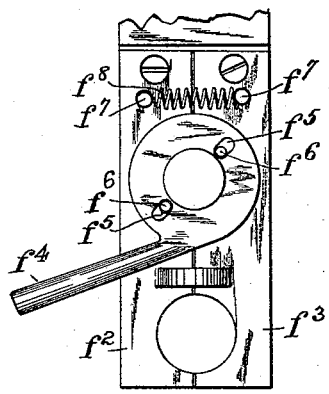
Fig. 38
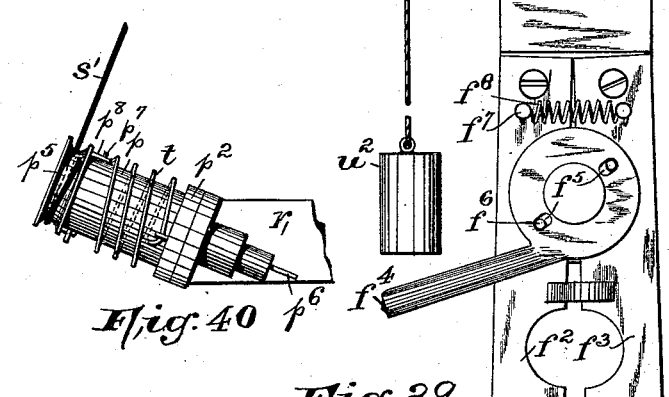
Fig. 40  Fig. 39
WITNESSES: INVENTOR:
Charles Radcliffe,
BY Fred'k C. Fraentzel, ATT'Y.

UNITED STATES PATENT OFFICE.

CHARLES RADCLIFFE, OF NEWARK, NEW JERSEY.

BUTTON-ATTACHING MACHINE.

SPECIFICATION forming part of Letters Patent No. 486,895, dated November 29, 1892.

Application filed January 13, 1892. Serial No. 417,928. (No model.)

*To all whom it may concern:*

Be it known that I, CHARLES RADCLIFFE, a citizen of the United States, residing at Newark, in the county of Essex and State of New Jersey, have invented certain new and useful Improvements in Button-Attaching Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In an application for Letters Patent filed by myself on June 30, 1891, Serial No. 397,986, is illustrated an improved form of button adapted to be attached or secured to the material without the use of thread or needle.

This invention relates to a machine for automatically feeding the back-plates of this form of button, each provided with an upright post, as shown in the drawings of said application, beneath the cloth and forcing the post through the same, and also for feeding the shell of the button directly over the point of said post, forcing the latter through a rectangular slot or opening in the hub of said shell, bending the arms on said post across said rectangular opening, and thereby forming a complete button firmly attached to the material.

One object of my invention, therefore, is to provide a machine for uniting the ready-made back portions with the front portions and thereby produce a finished button.

Another object of my invention is to provide the machine with separate pockets or receivers, one for holding the back-plates provided with the upright posts and the other for holding the shells, and means in each pocket for feeding a back-plate beneath a proper chuck or punch, by means of which the post on said back-plate can be forced through the material, and then feeding the shell directly above the inserted post and securing the several parts comprising the button in position upon the material.

To the above purposes my invention consists of certain combinations and arrangements of parts, such as will be hereinafter more fully set forth, and finally embodied in the clauses of the claim, and comprising therein principally the following mechanical devices: Two pockets or receivers arranged upon a standard, a step-by-step mechanism in each pocket for feeding the back-plates in the one pocket into a certain chute or raceway and feeding the shells in the other pocket into a second chute or raceway, a slide or guide upon which the back-plates are fed, a hunter for rotating the post on said back-plate into its proper position on said slide, a pivoted chuck or punch for forcing the post upon the back-plate through the material, a pivoted guide for feeding the shells in front of a second hunter, which hunter rotates the shell so that it presents the rectangular opening in its hub properly to the post, means on said pivoted guide, whereby the shell can be forced between spring-arms on said chuck or punch and by means of which said shell can be arranged upon the upwardly-projecting post on the back-plate, a slotted spindle in said chuck or punch, which projects through an opening in the top or face of the shell and is adapted to engage with the oppositely-projecting arms on the post on the back-plate, and means on said chuck connected with said spindle for giving the same a quarter-turn and bending said arms on the post across the slot in the hub of the shell, and thereby firmly securing the parts of the button upon the material, and, further, the several forms of mechanism for operating these mechanical devices, and thereby making a compact and operative machine. These forms of constructions selected to embody the invention in an operative machine are illustrated in the accompanying twelve sheets of drawings, in which—

Figure 2:
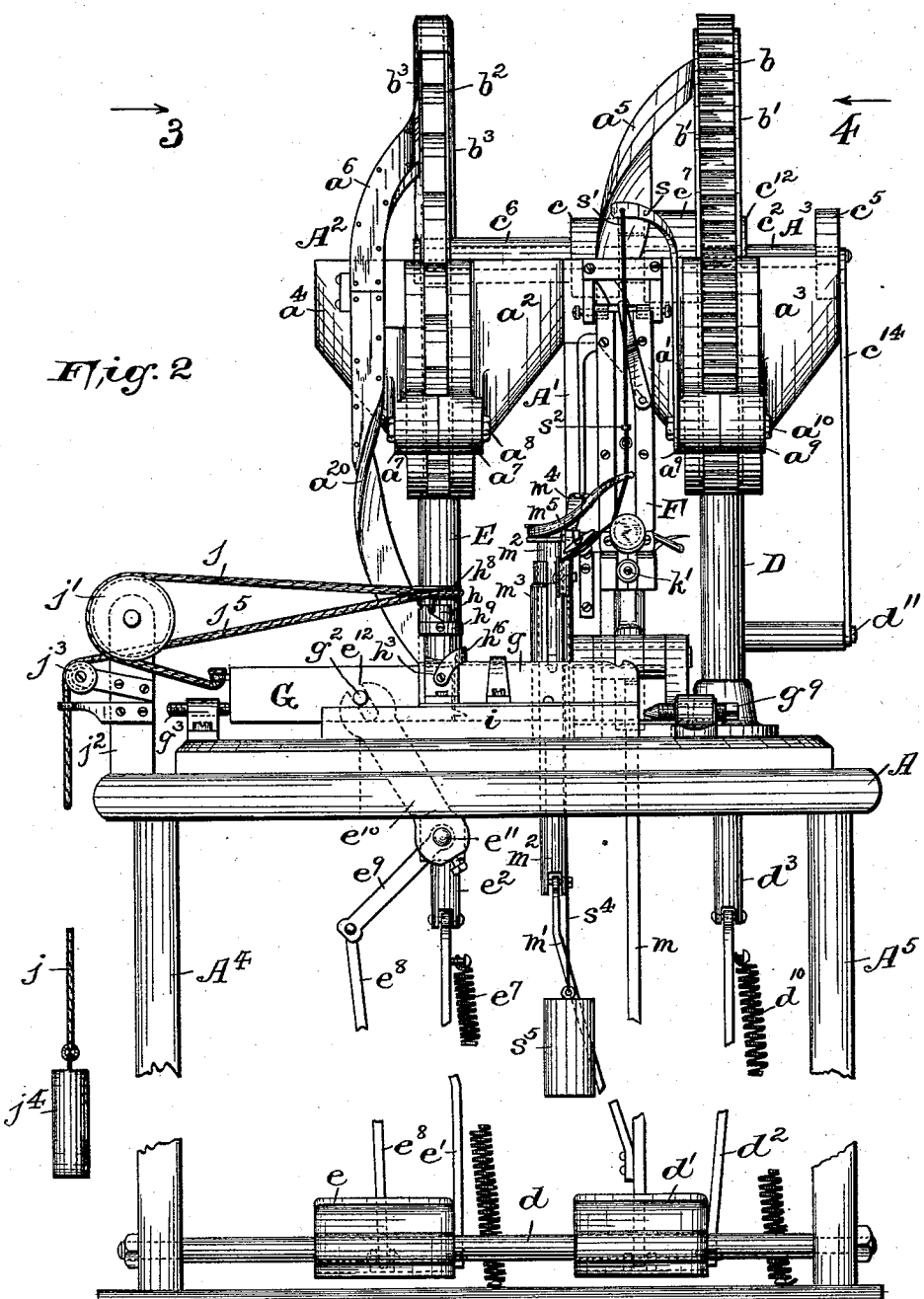
Figure 3:
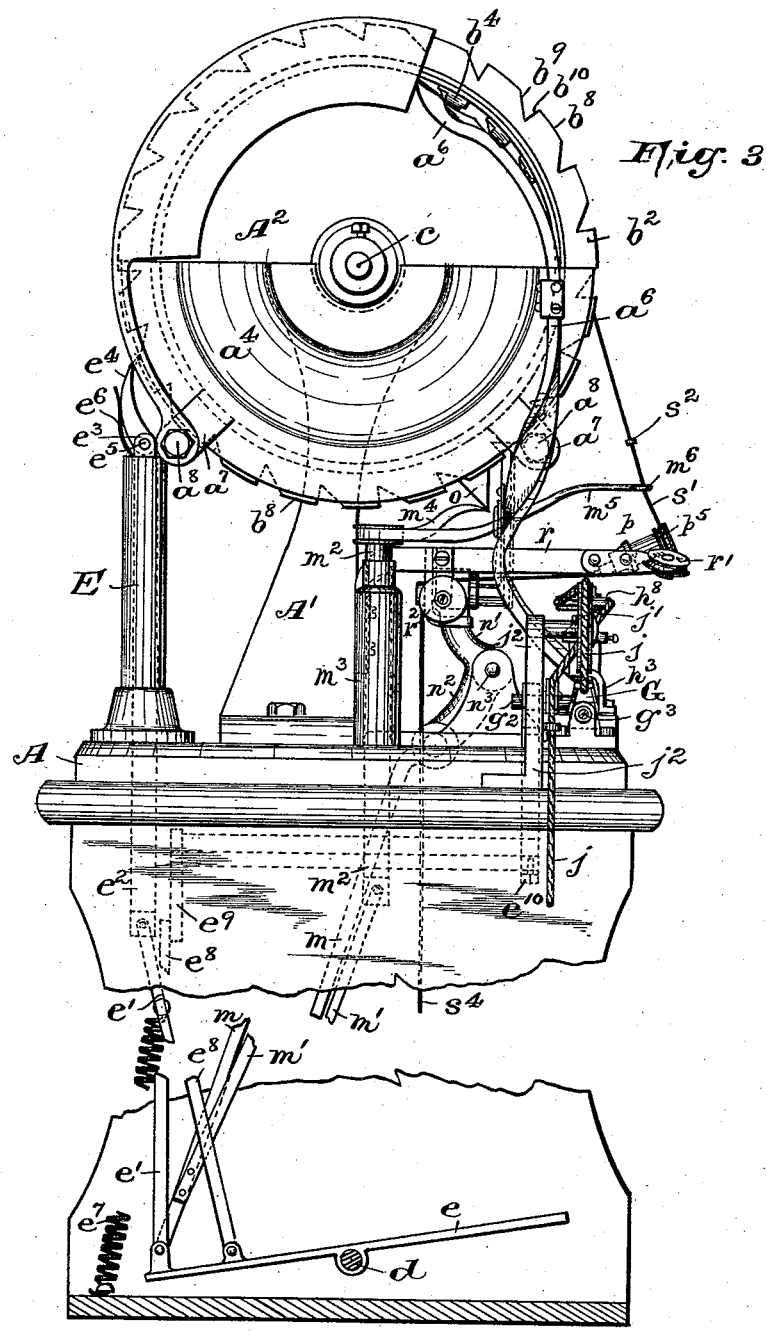
Figure 4:
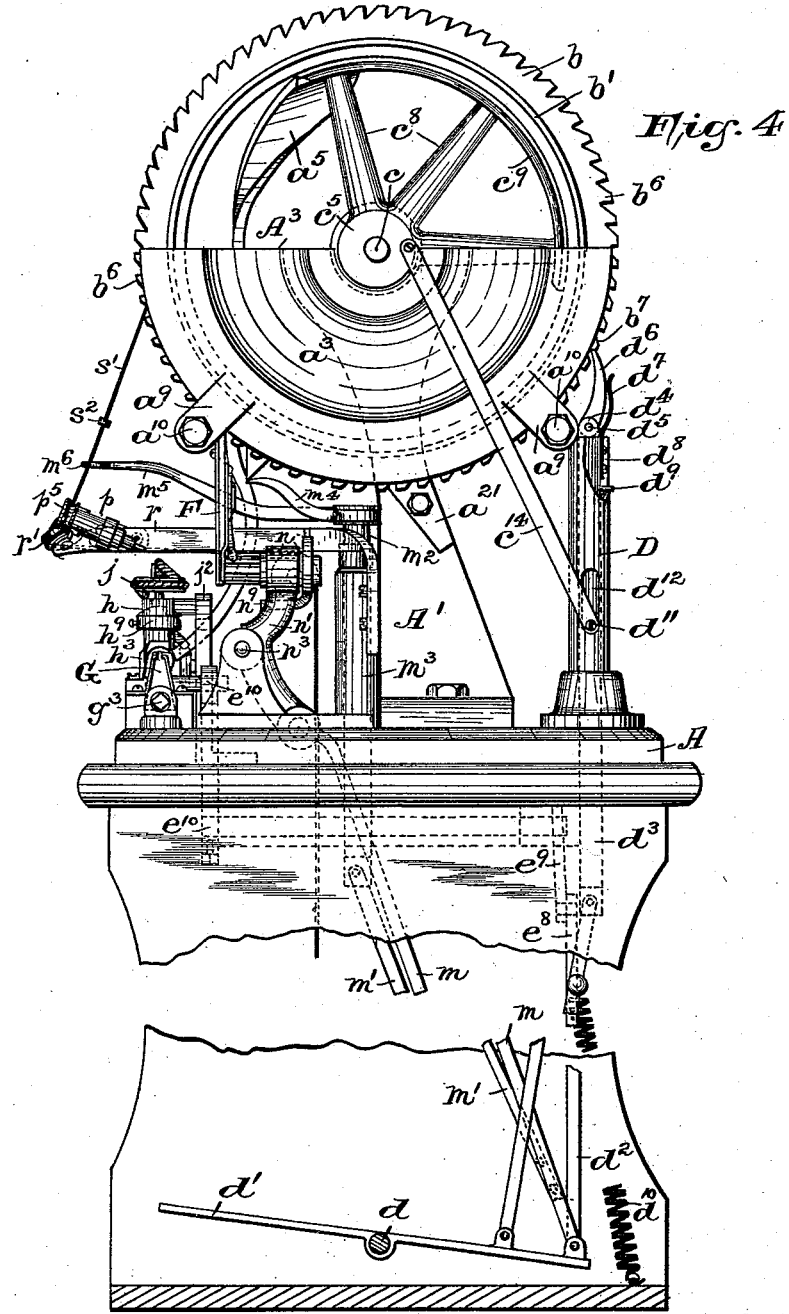
Figure 5:
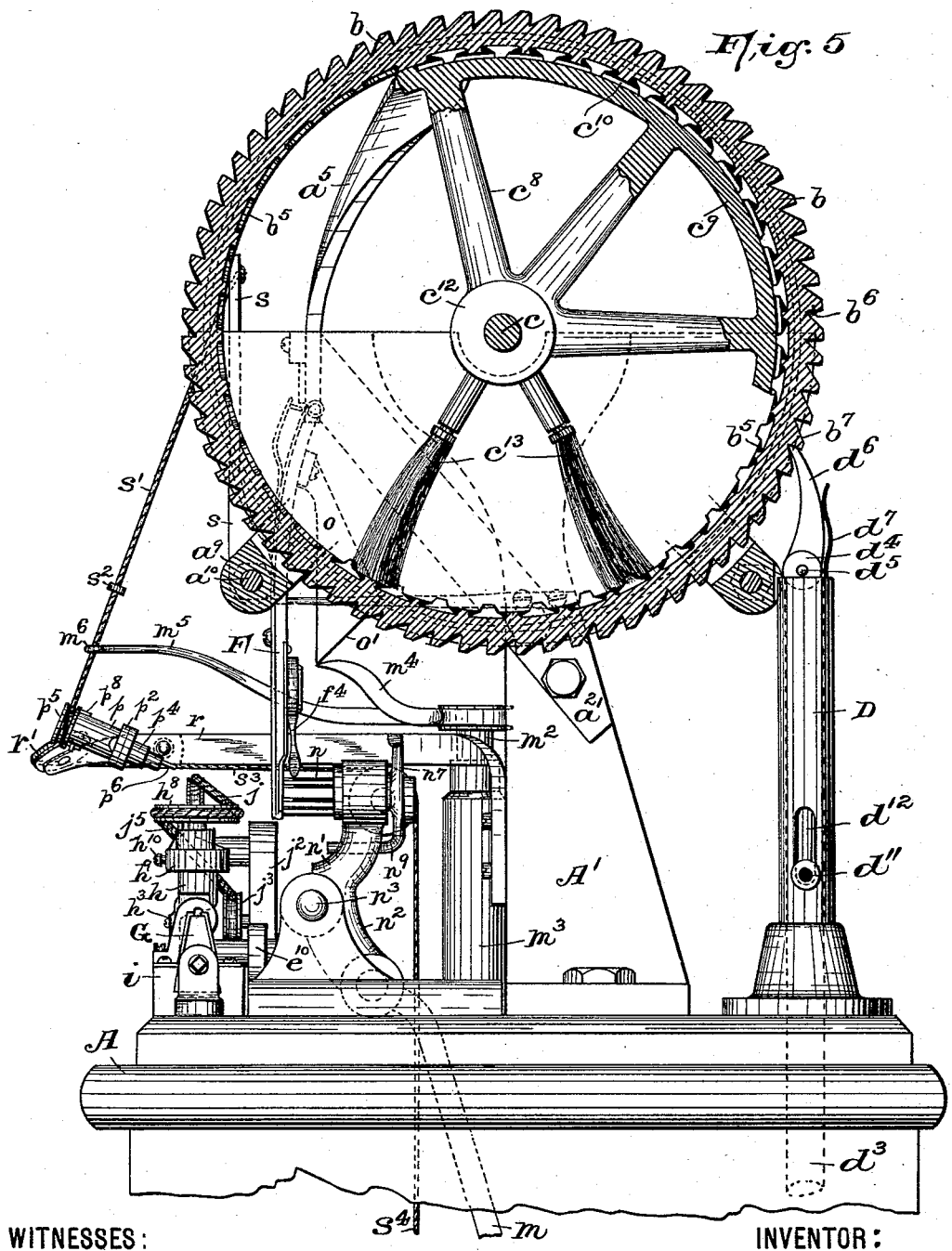
Figure 6:
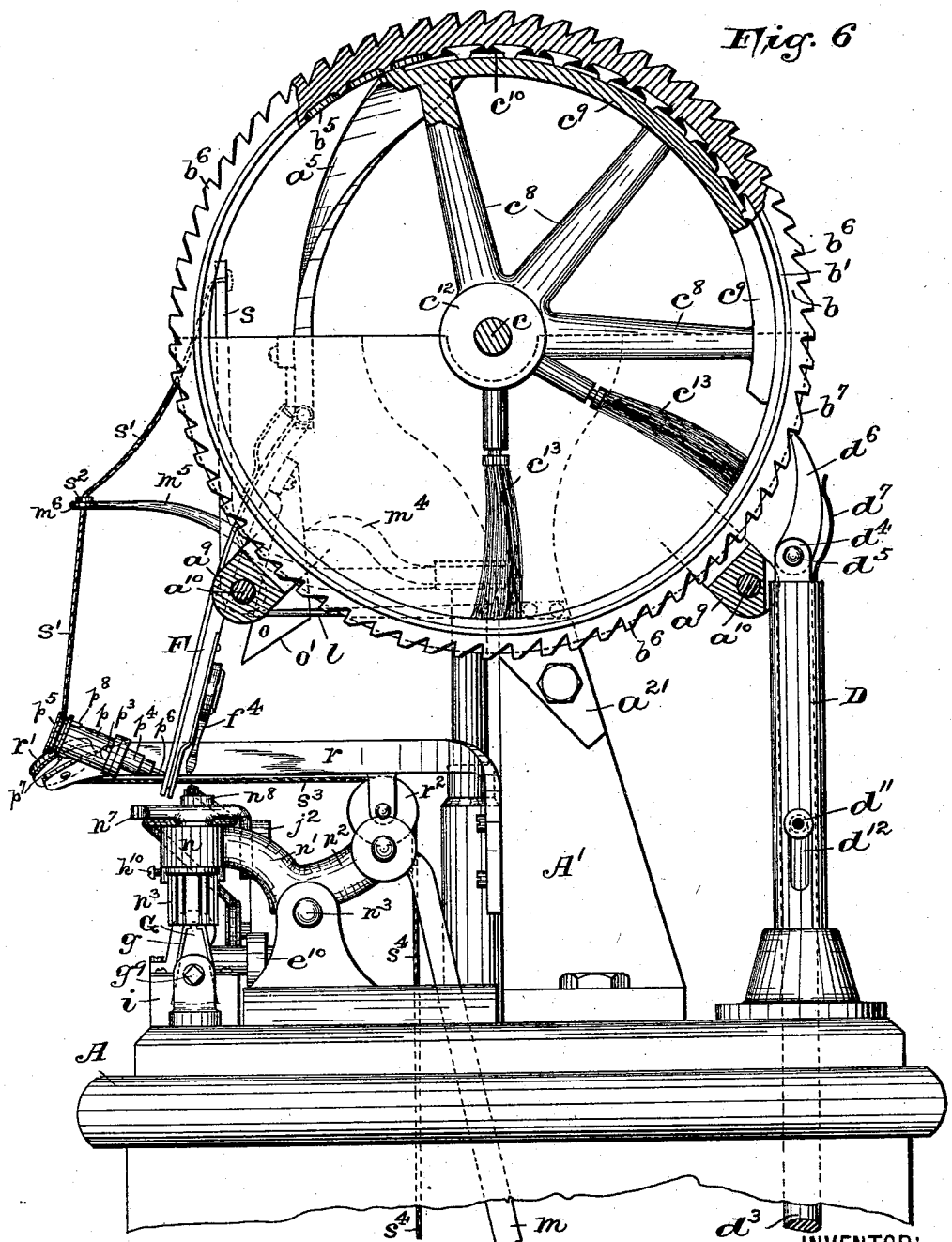
Figure 7:
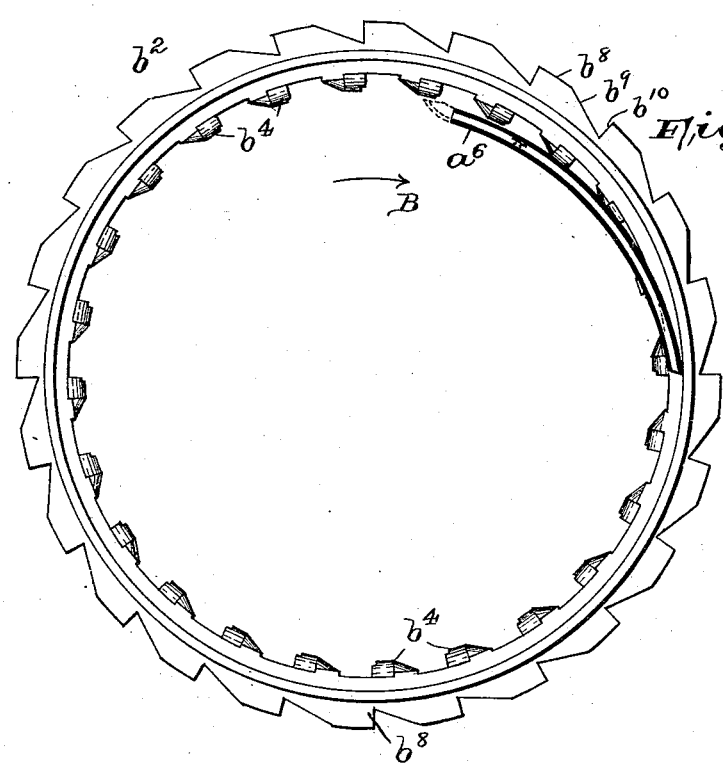
Figure 8:
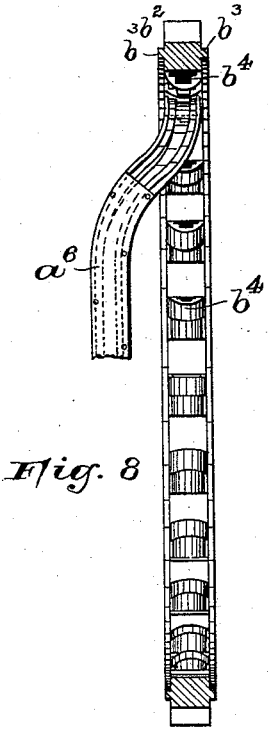
Figure 9:
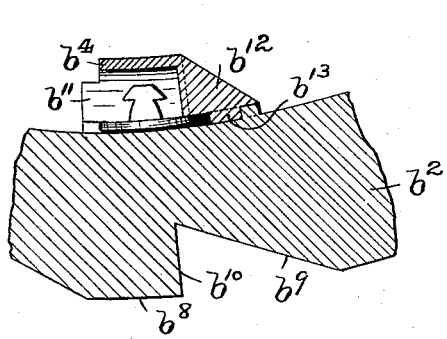
Figure 10:
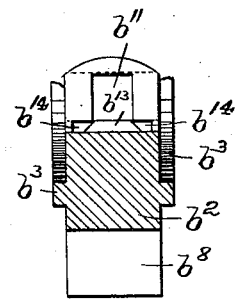
Figure 11:
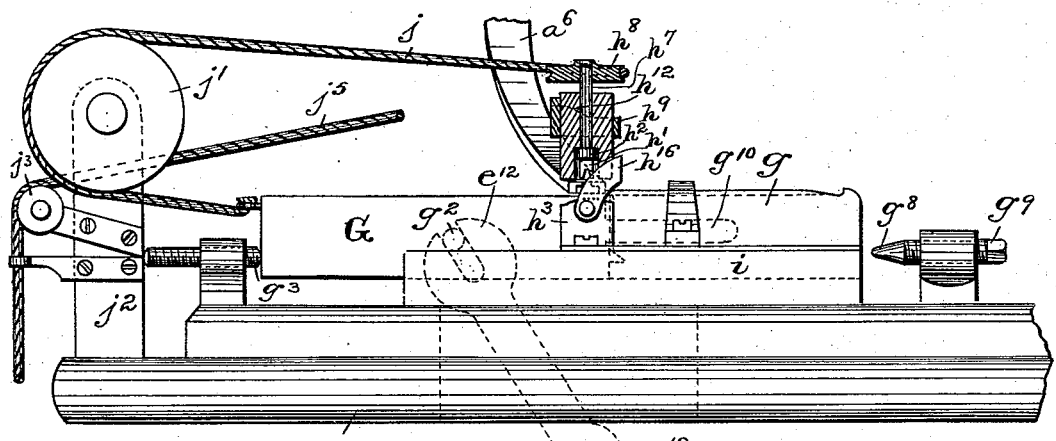
Figure 12:
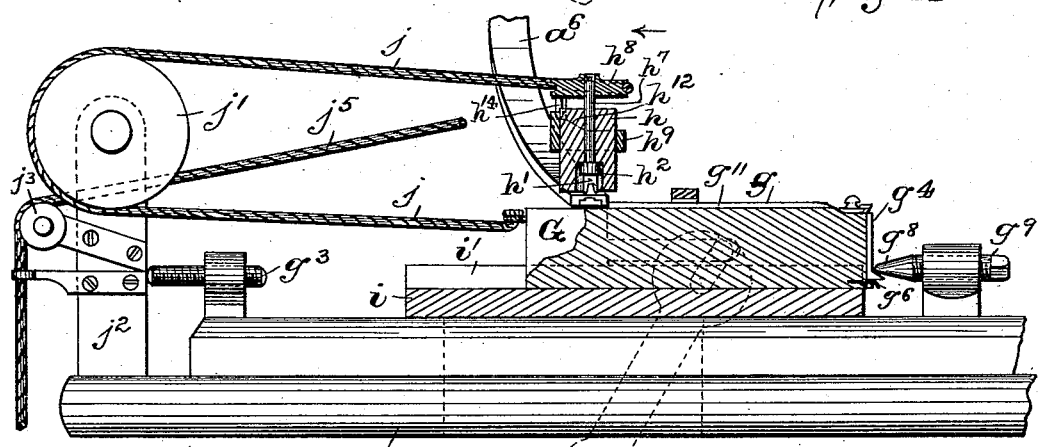
Figure 14:
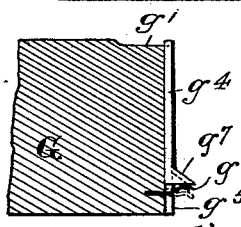
Figure 15:
Figures 13, 16:
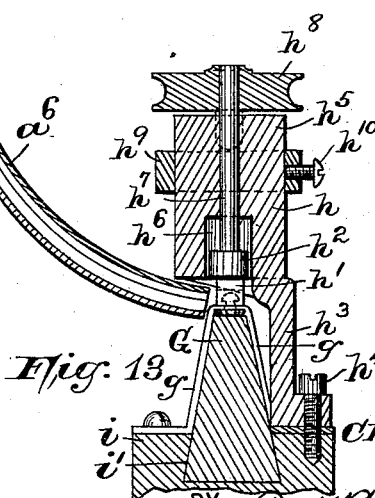
Figure 17:
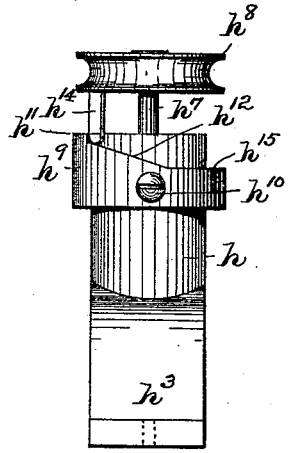
Figure 18:
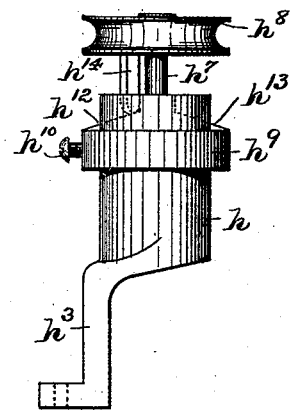
Figure 19:
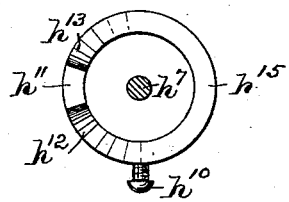
Figure 20:
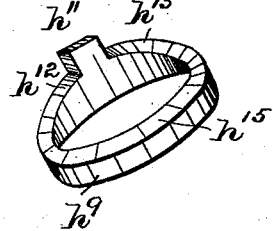
Figure 21:
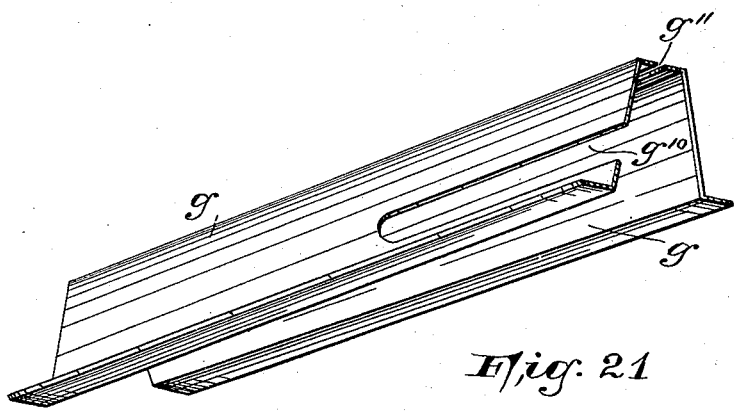
Figure 26:
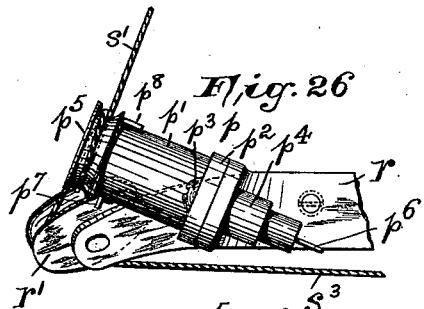
Figure 27:
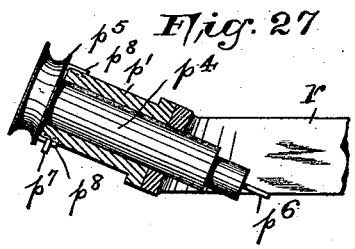
Figure 28:
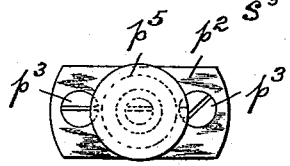
Figure 29:
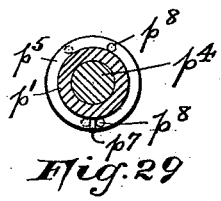
Figure 30:
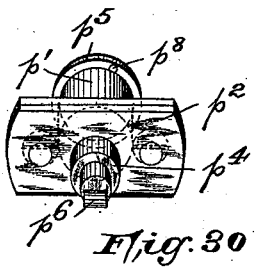
Figure 31:
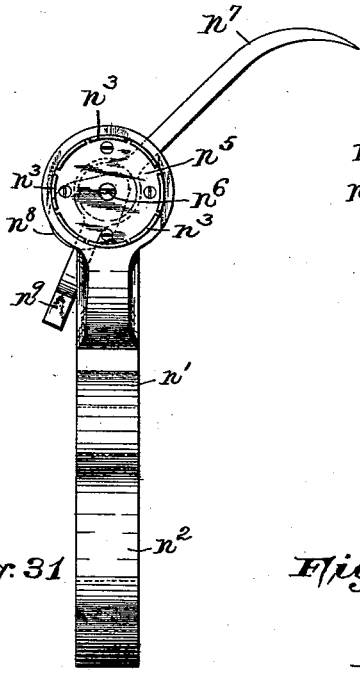
Figures 32, 33:
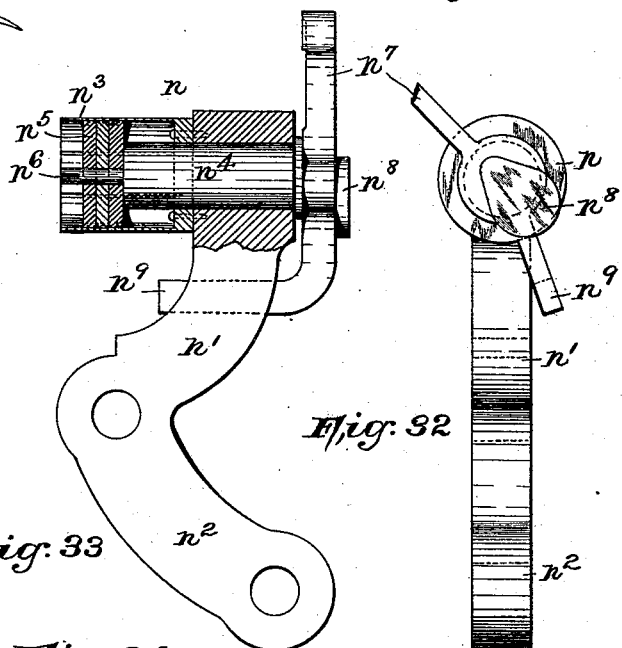
Figure 34:
Figures 35, 36:
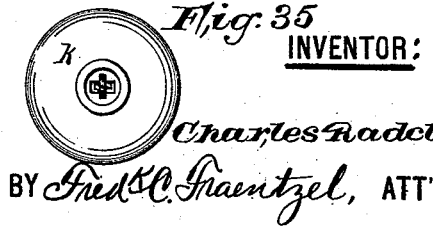

Figure 1 represents a plan or top view of the machine embodying my invention; and Fig. 2 is a front view of the same, the operating parts in both of these views occupying the positions which they adopt when the machine is ready for delivering the several parts of the button to their proper places in the machine, where said parts are to be secured together upon the material. Fig. 3 is a side view of the machine, looking in the direction of arrow 3 in Fig. 2; and Fig. 4 is a similar view of the machine, looking in the direction of arrow 4 in said Fig. 2, both views clearly illustrating an arrangement of foot-treadles and connecting-levers for operating the several parts of the machine. Fig. 5 is a view similar to that shown in Fig. 4 of the upper part of the machine, but considerably enlarged, and the mechanism for feeding the shells contained in the shell-pocket to the chute or raceway being represented in vertical section. Fig. 6 is a view of the several mechanisms illustrated in Fig. 5, clearly illustrating the several parts thereof in their operative positions. Fig. 7 is a side view of a toothed ring used in connection with the back-plate-containing pocket, provided on its inner periphery with small pockets, each adapted to pick up one back-plate for feeding the latter into the raceway or chute connected with said ring. Fig. 8 is a vertical section of said ring and the upper part of said chute or raceway. Fig. 9 is an enlarged vertical section of a part of said ring and one of the back-plate-holding pockets with a back-plate and its post in position therein about to be fed into the chute or raceway; and Fig. 10 is a cross-section of said ring, the holding-pocket being illustrated in front elevation, both figures clearly showing one manner of attaching the holding-pockets to the inner periphery of the said ring. Fig. 11 is an enlarged front view of a slide used in the present form of machine for bringing the back-plate provided with a post to a proper position, ready to be forced through the material of the cloth. In connection with said figure is shown part of the back-plate-feeding chute or raceway, a hunter in vertical section for properly placing the back-plate and its post upon the slide, and a system of pulleys and a belt or cord for operating the hunter as the slide is forced forward by a cam-lever. (Indicated in said view in dotted outline.) Fig. 12 is a similar view of these mechanisms, but illustrating the slide in vertical section and in its forward position, having carried with it the back-plate and its post to the desired position. Fig. 13 is an enlarged vertical cross-section of said slide, and hunter and part of the back-plate-feeding chute or raceway. Fig. 14 is an enlarged vertical section of the forward end of the slide, provided in its upper side with a recess or seat for receiving the back-plate and a spring-actuated rod, which normally projects above the edge of said recess and acts as a stop to hold the back-plate in said recess or seat when it is fed from the chute upon the same and while moving with said slide to the position indicated in Fig. 12. Fig. 15 is a top view of said portion of the slide illustrated in said Fig. 14. Fig. 16 is a vertical section of the back-plate-feeding chute or raceway with one of the back-plates in position therein. Figs. 17 and 18 are a front and side view, respectively, of a hunter used in connection with said slide, the hunting-spindle and its operating-pulley being shown in their highest positions, ready to be operated and cause the lower and slotted end of the said spindle to engage with the flat post on the back-plate, and thereby turn it in the proper position to enter the slotted casing or shield surrounding the slide mentioned in the above. Fig. 19 is a top view of said hunter and a cam-shaped ring, and Fig. 20 is a perspective view of the cam-shaped ring used in connection with the hunter. Fig. 21 is a perspective view of said slotted shield or plate which acts as a guide for said slide and allows the same to be moved forwardly and backwardly therein. Fig. 22 is a front view of a shell-guide pivotally attached to the lower end of the shell-feeding chute or raceway. Fig. 23 is a vertical section of the same, said section being taken on line 23 in said Fig. 22; and Fig. 24 is a back view of said pivoted guide or feeder. Fig. 25 is a section of the same, taken on line 25 in said Fig. 24. Fig. 26 is an enlarged front view of the hunter used for rotating the button in the pivoted guide or feeder illustrated in Figs. 22, 23, et seq., attached to an arm secured to the standard of the machine, provided with a pulley on its free end and a weighted rope or belt passing over said pulley and the pulley on the hunting-spindle in said hunter for rotating the said spindle in its sleeve. Fig. 27 is a vertical section of the sleeve of the hunter and the arrangement of the pulley-wheel on the upper end of the hunting-spindle, provided with two downwardly-projecting pins, which engage with a pin projecting from the side of the sleeve, and thereby limit the movement of said spindle. Fig. 28 is a front view of the pulley end of the hunter. Fig. 29 is a cross-section of the same, looking upward; and Fig. 30 is a view of the lower end of the hunter. Figs. 31 and 32 are a front view and a back view, respectively, of a pivoted chuck or punch for forcing the end of the post on the back-plate of the button through the cloth and also for holding the shell of the button in its spring-actuated jaw for placing the same over the post on the back-plate and a lever or handle for rotating the spindle in said chuck or punch when necessary. Fig. 33 is a side view of the pivoted chuck or punch, the holding portion thereof being illustrated in section to clearly show the arrangement of the slotted spindle therein. Fig. 34 is an enlarged front view of the back-plate and its post; and Fig. 35 is a top view, and Fig. 36 a sectional view, of the shell employed to make the button which is to be secured upon the cloth by means of the herein-shown machine. Fig. 35 also shows in top view a completed button with the oppositely-projecting arms on the post on the back-plate forced at right angles across the rectangular slot in the hub of the shell, being twisted into such position by means of the slotted spindle illustrated in connection with the chuck shown in Fig. 33. Fig. 37 represents a shell-guide (shown in Figs. 22 and 23) provided with a weight and cord passing over a pulley for returning said guide to its normal position after it has been raised. Figs. 38 and 39 are views of a cam-lever and two spring-actuated plates pivoted to the back of the shell guide or feeder, said guides being provided with pins extending into slots in said cam-lever for operating said plates. Fig. 40 is a modified form of the hunter illustrated in Fig. 26, in which case the cord passing over the pulley is secured thereon and wound around its periphery once or twice for rotating the hunter and the sleeve being provided with a spring, one end of which is secured to one of the pins on the pulley and the other to the framework to which the sleeve of the hunter is secured, said spring causing the return of the pulley on the hunting-spindle when the tension is taken from the cord around the pulley.

In the above-described figures similar reference-letters are employed to indicate corresponding parts in each of the several views.

In the drawings, A designates any suitable stand or table provided with the mechanisms for feeding, first, the back-plates, one at a time, to the slide; secondly, forcing the head of the post through the material, and, thirdly, for securing the shell of the button down upon the material and the back-plate.

$A'$ is a standard secured in any convenient manner upon said table or support. On opposite sides of the upper end of said standard $A'$ are secured by means of screws or small bolts $a$, as indicated in dotted lines in Fig. 1, or in any other well-known manner, the half-sections $a'$ and $a^2$, respectively, which with the half-sections $a^3$ and $a^4$ and the toothed rings $b$ and $b^2$ form two pockets or receivers $A^2$ and $A^3$, respectively. The half-sections $a^2$ and $a^4$ are provided with the downwardly-projecting lugs $a^7$, and the two sections are secured together by means of the bolts $a^8$, thereby forming the pocket or receiver $A^2$. The half-sections $a'$ and $a^3$ are provided with similarly-arranged lugs or ears $a^9$ and are secured together by means of the bolts $a^{10}$, thereby forming the pocket or receiver $A^3$. The semicircular flanges $a^{11}$ and $a^{12}$ of the half-sections $a'$ and $a^3$, respectively, forming the pocket or receiver $A^3$, are provided with grooves $a^{13}$ and $a^{14}$, respectively, and between said grooves is fitted a ring $b$, having annular projections $b'$ on its opposite sides, which fit into said grooves $a^{13}$ and $a^{14}$, and whereby said ring can be made to rotate between said flanges of the half-sections $a'$ and $a^3$, as will be clearly seen from said Fig. 1. The half-sections $a^2$ and $a^4$ are provided with similarly-arranged flanges $a^{15}$ and $a^{16}$, respectively provided on their inner surfaces with grooves $a^{17}$ and $a^{18}$, respectively, and between said half-sections $a^2$ and $a^4$ I have arranged a ring $b^2$, having on its opposite sides the annular projections $b^3$, extending into said grooves $a^{17}$ and $a^{18}$, whereby said ring $b^2$ is free to move between said half-sections $a^2$ and $a^4$, forming the pocket or receiver $A^2$. To one of said half-sections, as $a'$, is secured by means of screws or bolts $c'$ a suitable bearing $c$, in which has been arranged a suitable shaft $c^2$, projecting at one end into the back-plate-receiving pocket $A^2$ and provided with a boss or collar $c^3$, from which project suitable brushes $c^4$ for sweeping the back-plates into small holding-pockets $b^4$, suitably placed on the inner rim of the ring $b^2$. The other end of said shaft $c^2$ has secured thereto a wheel $c^5$, which loosely rests in a semicircular cut-away portion $a^{19}$ in the half-section $a^3$. Upon said shaft $c^2$, extending from the brush-holding collar $c^3$ and through the stationary bearing $c$, is placed a stationary sleeve $c^6$, to which is secured a boss $c^7$, provided with three or more arms $c^8$, connected by means of rims $c^9$, having in its outer surface a groove $c^{10}$, which terminates at one side of the rim, as at $c^{11}$, and as clearly shown in said Fig. 1. Adjacent to said boss $c^7$ and firmly secured upon the shaft $c^2$ I have arranged a collar $c^{12}$, provided with the downwardly-extending brushes $c^{13}$ for sweeping the shells of the buttons into circular recesses $b^5$ in said ring, and from which said shells are fed up into the groove $c^{10}$ in the rim $c^9$, secured upon the arms $c^8$, as will be clearly seen from Figs. 1, 5, and 6. The ring $b$ is provided on its outer periphery with equally-spaced teeth or projections $b^6$, and in order to give said ring a step-by-step movement a hollow or tubular standard D is secured to the table A, as shown. The standards $A^4$ and $A^5$ of the table are connected by means of a rod $d$, upon which has been secured a treadle $d'$, provided at one end with a lever $d^2$, which is pivotally secured to a rod $d^3$, extending through the table A and into said standard D. Said rod projects from the upper end of said standard, being provided with the ears $d^4$, between which is pivoted by means of a pin $d^5$ a jaw $d^6$, which is forced against the teeth $b^6$ on the ring $b$ by means of a spring $d^7$ in normal engagement with the back of said jaw $d^6$, as will be clearly seen from Figs. 4, 5, and 6. Said standard D is provided in its upper end with a slot $d^8$, whereby said rod is capable of an up-and-down movement, but cannot rotate in the standard D. When the treadle $d'$ is pressed downwardly by means of the foot of the operator, the jaw $d^6$ rotates the ring $b$ one space equal to the distance between two teeth, and when the foot has been taken from the treadle a spring $d^{10}$ causes the return of said rod $d^3$ to its normal position, sliding the point of the inclined jaw $d^6$ over the inclined surface $b^7$ of the next lower tooth on said ring $b$ until said point is caused to engage with said tooth, and the ring $b$ can be again rotated one space by operating the treadle $d'$.

The mechanism for producing a step-by-step movement of the ring $b^2$ between the half-sections $a^2$ and $a^4$ is similar to that just described in connection with the ring $b$. Said ring $b^2$ is provided with a suitable number of teeth $b^8$, having the inclined portions $b^9$ and the straight portions $b^{10}$. Arranged upon the table A is a hollow or tubular standard E, and upon the shaft $d$ is secured a second treadle $e$, to which has been attached a lever $e'$, which is pivotally secured to the lower end of a rod $e^2$. Said rod extends up through the table A and through said perforated standard E and projects therefrom at the top. Said end is provided with ears $e^3$, between which is pivoted a jaw $e^4$ by means of a pin $e^5$. Said jaw is normally forced against the teeth $b^8$ on the wheel $b^2$, and by means of the operation of the treadle $e$ said wheel can be moved one space, as will be evident. A spring $e^7$, secured to the lever $e^8$, causes the normal return of this mechanism when the foot has been taken from the treadle $e$.

As will be seen from Figs. 2, 5, and 6, I have secured to the standard of the machine a peculiarly-twisted chute or raceway $a^5$, which at its upper end terminates in close proximity to the groove or passage $c^{11}$ in the rim $c^9$, supported by the arms $c^8$ on the sleeve $c^6$. The lower end of said chute terminates above a pivoted shell feeder or slide F, as clearly shown in Fig. 2, and the operation of which will be described in detail hereinafter. From the same figures it will be seen that a second chute $a^6$ is secured to the outside of the pocket or receiver $A^2$, its upper end projecting beneath the pockets $b^4$ on the inner periphery of the ring $b^2$ in said pocket or receiver $A^2$, and the lower end of said chute terminating above a pocket $g'$ in the end of a slide G, adapted to be moved backward and forward in a shield or casing $g$, as will be hereinafter more fully described.

As will be seen from Figs. 1, 2, and 4, the standard D is provided in its lower portion with an opening $d^{12}$, through which projects a pin $d^{11}$, which is secured in the rod $d^3$. Said pin $d^{11}$ is connected with the wheel $c^5$ by means of a link $c^{14}$, whereby when the treadle $d'$ is depressed and the rod $d^3$ moves upward the shaft $c$ receives an oscillatory movement, and hence the brushes $c^{13}$ in the receiver $A^3$ and the brushes $c^4$ in the receiver $A^2$ will move forward and backward as the treadles are worked by the operator, and hence the back-plates in the pocket or receiver $A^2$ are forced into the pockets $b^4$ on the ring $b^2$ and the shells $d$ in the pocket $A^3$ are forced into the recesses $b^5$ in the ring $b$.

I will now describe the manner and operation of feeding the back-plates provided with the upright posts from the pocket or receiver $A^2$ to the recess $g'$ in the end of the slide G. As will be seen more especially from Figs. 7, 8, 9, and 10, said toothed ring $b^2$, arranged between the half-sections $a^2$ and $a^4$ and rotating therebetween, is provided on its inner surface, as has been previously stated, with the back-plate-holding pockets $b^4$. Said pockets, as will be clearly seen from Figs. 9 and 10, are open at one end, as at $b^{11}$, and closed at the other end $b^{12}$, being provided with a tongue $b^{13}$, by means of which the pocket is dovetailed to the cut-away or recessed portions $b^{14}$ on the inner surface of the ring $b^2$. Each pocket $b^4$ is thus securely held in its position upon said surface, one pocket for each tooth on the outer periphery of said ring. Said pockets may, however, be secured to said inner periphery of the ring in any other well-known manner. The back-plates of the button are thrown into the pocket or receiver $A^2$, and by operating the treadle $e$ the ring $b^2$ is caused to move between the half-sections $a^2$ and $a^4$, whereby by the action of the said ring against the lower ends of the brushes $c^4$ each pocket $b^4$ in the lower portion of the said ring becomes filled with one back-plate, which assumes its position therein, as clearly shown in Fig. 9, and thus as said ring $b^2$ moves in the direction of the arrow B, Fig. 7, each pocket brings its back-plate directly above the upper and open end of the chute or raceway $a^6$, and the back-plate is thereby discharged upon this end of the chute with its post projecting downwardly. Said chute or raceway, however, is provided with a twist $a^{20}$, as will be seen from Fig. 2, whereby as the back-plate passes down along the chute its position is reversed and the back-plate is deposited or fed, with its post extending upwardly, upon the upper surface of the slide G when the latter is in the position shown in Fig. 12. The mechanism for causing said slide G to move forwardly or backwardly consists of a lever $e^8$, pivoted at one end to the treadle $e$ and at its other end to a short arm $e^9$, which causes the arm $e^{10}$ to be moved forwardly on its pivotal pin $e^{11}$, as will be clearly seen from Fig. 2. Said arm $e^{10}$ is provided with a slotted end $e^{12}$, which engages with a pin $g^2$, arranged on the slide G, whereby said slide can be moved forwardly or backwardly by the operation of the treadle $e$ and this system of intermediately-arranged levers. Suppose, for example, said slide G has been moved forwardly, as shown in Fig. 12, and is about to return to its normal position. (Shown in Fig. 11.) When in its forward position a back-plate has been deposited upon the upper flat surface of said slide G, and immediately the slotted end $h'$ of the hunting-spindle $h^2$ engages with said post, and by means of its rotary movement in the hunter $h$ said post is turned into such a position upon the slide that its flattened sides are parallel to the longitudinal edges of the upper side of said slide. This hunter $h$ consists, essentially, of a post $h^3$, secured by means of a screw $h^4$ upon a base-plate $i$, provided with a groove $i'$, in which said slide G moves, as will be seen from Fig. 13. Said hunter is provided at its upper end with an enlarged portion $h^5$, being provided at its lower portion with a chamber $h^6$ and a bore $h^7$, extending from said chamber to the upper surface of said enlarged portion. Within said bore $h^7$ is arranged the hunting-spindle $h^2$, which is provided at the top with a pulley $h^8$. Upon said enlarged portion $h^5$ of the hunter I have secured by means of a screw $h^{10}$ a ring $h^9$, provided with a stop $h^{11}$, from which extend on the opposite sides thereof two inclined ways $h^{12}$ and $h^{13}$, as will be clearly seen from Figs. 18, 19, and 20. As will be seen from Figs. 2, 11, and 12, in the rear end of said slide G, I have attached the end of a rope or belt $j$, which passes over a grooved pulley $j'$ on the post $j^2$, extending up from the table A', and from this pulley the cord or belt $j$ passes around the grooved pulley $h^8$ on the hunting-spindle $h^2$, and thence over another pulley $j^3$ on said standard $j^2$. To the free end of said cord $j$ is secured a weight $j^4$. Now when the slide G moves from the position indicated in Fig. 12 to that shown in Fig. 11 the weight $j^4$, attached to the free end of the cord $j$, moves downwardly and causes the wheel $h^8$ and its hunting-spindle to rotate within the bearing in the hunter. Owing to the downward pull of that portion $j^5$ of the rope between the pulley $j^3$ and the pulley $h^8$ on the hunting-spindle, a downwardly-projecting pin $h^{14}$ on said wheel $h^8$ moves down along the incline $h^{12}$ and along the flat space $h^{15}$ on the ring $h^9$ and up again on the incline $h^{13}$ until said pin $h^{14}$ strikes the opposite side of the stop $h^{11}$. During this rotary movement the hunting-spindle has also received a downward and upward movement, during which movements the slotted end of the spindle has embraced the flat-end portion of the post on the back-plate and has turned the same into the proper position above mentioned and has disengaged itself from said post as the pin $h^{14}$ moves up the incline $h^{13}$. During this operation the slide G has moved back against the adjusting-stop $g^3$, bringing the recess $g'$ directly beneath the hunter and causing the properly-placed back-plate to drop into said recess. In the forward end of said slide G is a post $g^4$, which slides in a dovetailed groove $g^5$ in said end, and the upper end of which is normally projected above the surface of the recess $g'$ by the action of a spring $g^6$. This post serves to act as a stop and prevents the back-plate from being displaced by any sudden jars of the machine or during the forward movement of the slide. Said post $g^4$ is provided at its lower end with an inclined nose $g^7$, which engages with a pointed end $g^8$ of an adjusting-screw $g^9$ when the slide has been moved forward to the position indicated in Fig. 12, thereby depressing said post $g^4$ and forcing its upper edge below the surface $g'$ to enable the removal of said back-plate after the shell of the button has been secured thereon. As will be seen from Fig. 21, the casing $g$ consists of two plates, one of which is provided with a longitudinal opening or slot $g^{10}$ to permit the entrance of the pin $g^2$ therebetween when the slide moves forward. The two plates comprising the shield $g$ are secured upon the base $i$ in such a manner as to form a longitudinal slot or opening $g^{11}$ between them, which slot guides the adjusted or hunted back-plate in its proper position beneath the punch or chuck of the machine. (Illustrated in Figs. 5 and 6.) While this back-plate and its post have moved forwardly with the slide to the position indicated in Fig. 12, another back-plate has passed from the pocket $A^2$ down the chute or raceway $a^6$ upon the upper surface of the slide G, where it is hunted and turned into its proper position on the slide during the return of said slide in precisely the same manner as has just been described. In order to prevent the back-plate and its post from being forced from the upper surface of the slide as it passes from the end of the chute or raceway thereupon, I have secured to the post $h^3$ of the hunter a suitable guard $h^{16}$, which acts as a stop to the movement of said back-plate and retains the same in its position upon the slide, ready to be turned or hunted by the hunting-spindle.

I will now describe, first, the manner of feeding the shells of the button into the pivoted guide F; second, forcing the post on the back-plate through the material by means of a punch, and, third, placing said shell upon the end of said post projecting from the material and firmly securing it down thereupon. The shell of the button, which consists, as will be seen from Fig. 36, of a perforated face-plate $k$ and a slotted hub $k'$, is thrown into the pocket or receiver $A^3$, and by means of the rotary movement of the ring $b$ between the half-sections $a'$ and $a^3$ and the oscillatory movement of the brushes $c^{13}$ the recesses $b^5$ on the inner periphery of said ring $b$ are filled with the shells, as will be clearly seen from Fig. 5. When the ring $b$ is caused to move one space by means of the treadle $d'$, a shell passes into the peculiarly-twisted chute $a^5$, from which it is fed down upon the pivoted guide F, in which it is held upon a pin $l$, secured to the standard A', as shown in Fig. 5, and the forward end of which projects through an opening $f'$ in the body-plate $f$ of said grooved and pivoted guide F. At the same time as the treadle $d'$ is being operated a rod $m$, secured to said treadle, moves upwardly and causes the chuck or punch $n$ to assume the position shown in Fig. 6. At the same time a second rod $m'$ operates a rod $m^2$, sliding in a standard $m^3$, secured to the table of the machine. Said rod $m^2$ is provided with two arms or fingers $m^4$ and $m^5$, and as said rod $m^2$ passes upwardly the forward end of said finger $m^4$ moves along an inclined surface $o'$ on a plate $o$, secured to the back of said pivoted guide F, thereby causing said pivoted guide to assume the raised position shown in Fig. 6, at the same time being withdrawn from the end of the pin $l$ and allowing the shell to drop down into the lower end of said pivoted guide, where it is held by two plates $f^2$ and $f^3$, pivotally secured to the back of the guide, as will be evident from Figs. 22 and 24. The chuck or punch $n$, as will be clearly seen from Figs. 31, 32, and 33, consists of two connected arms $n'$ and $n^2$, pivoted by means of a pin $n^3$ in bearings projecting up from the table A. The lower arm $n^2$ is pivotally attached to said rod $m$, connected at its lower end with the treadle $d'$, which passes through an opening in the table. The upper end of the arm $n'$, as will be seen from Fig. 33, has secured thereto a suitable chuck $n$, provided with spring-actuated sides $n^3$, into the open end of which the shell of a button can be forced from the pivoted plates $f^2$ and $f^3$, as will be described later on. In the perforated end of said arm $n'$ and projecting into the chuck $n$ is arranged the spindle $n^4$, provided with the guiding-plates $n^5$ and a slotted punching end $n^6$, the purpose of which will be described hereinafter. The opposite end of said spindle $n^4$ is provided with a handle $n^7$, a weight $n^8$, and a lower arm $n^9$, projecting at a right angle therefrom and adapted to engage with the arm $n'$, whereby it acts as a stop and retains the spindle $n^4$ and its punching end in such a position that when the chuck and punching-rod are lowered, as in Fig. 6, and the waistband of a pair of trousers or overalls has been placed upon the upwardly-projecting post of the back-plate when in the position illustrated in Fig. 12, said slotted end $n^6$ corresponds with the direction of the flat post on the back-plate, and by the action of the treadle $d'$ said slotted rod $n^6$, owing to its downwardly-acting pressure, forces said end of the post on the back-plate and its oppositely-projecting arms entirely through the thickness of the material. In the meanwhile, as has been stated in the above, the shell of the button, which has dropped to that position in the pivoted guide F, (shown in Figs. 22 and 24,) is rotated by means of the hunter $p$, (shown in the several figures of the drawings and especially in Figs. 26 to 30, inclusive,) so as to bring the rectangular slot in the hub of said shell into its proper position, so that it can be readily forced down over the end of the post projecting through the material placed upon the forward end of the slide G, the post having been forced through the material by the previous operation, as has been stated in the above.

The construction and operation of the hunter $p$ are as follows: Said hunter consists of a tubular portion $p'$, having at its lower end the perforated ears $p^2$, (see Fig. 28,) and by means of screws $p^3$ said portion is secured in position upon an arm $r$, attached to the standard A′, as will be seen from Figs. 5 and 6. Within the said tubular portion $p'$ I have arranged a spindle $p^4$, provided with a pulley or grooved wheel $p^5$ on its free end, and on its lower end said spindle is provided with a flat hunting-piece $p^6$. On the free end of said arm $r$, directly beneath the pulley or grooved wheel on this hunter $p$, is arranged another pulley or grooved wheel $r'$. To one of the half-sections of the pocket or receiver A³, as $a'$, I have secured a rod $s$, to the upper end of which has been secured the end of a cord $s'$, provided with a suitable stop-piece $s^2$. Said cord passes through an eye $m^6$ on the free end of the finger $m^5$ and is wound around the grooved pulley $p^5$, around the pulley $r'$ on the arm $r$, then extends back, as at $s^3$, over the grooved pulley $r^2$, secured to said arm $r$, as plainly shown in Fig. 3, and terminates in the free end $s^4$, provided with a weight $s^5$. At the same time that the rod $m^2$ is being raised by the action of the treadle $d'$ said finger $m^5$ raises and causes the engagement of the eye $m^6$ with the stop-piece $s^2$ on the cord $s'$, which turns the pulley $p^5$, and hence the spindle $p^4$, until one of the pins $p^8$ on the pulley $p^5$ (see Figs. 26, 27, and 29) engages with a stop-pin $p^7$ on the tubular portion $p'$ of the hunter $p$. At the same time the pivoted guide F has been caused to assume the position shown in Fig. 6, and the flat hunting-piece $p^6$ enters into the rectangular slot or opening in the hub of the shell and turns the latter within its guide F, as will be understood. Thus while the slotted punch $n^6$ forces the post on the back-plate through the material on the slide G said spindle $p^4$ turns the shell of the button properly, so as to permit the entrance of said post into the slotted hub, as will now be described. The pressure upon the treadle $d'$ is now removed, whereby the chuck $n$, the pivoted slide F, and the hunter $p$ by means of the weights $s^5$ and the cord $s$ resume their normal relative positions. (Illustrated in Fig. 5.) A cam-lever $f^4$, provided with oppositely-placed slots $f^5$, is then slightly raised by the operator to the position indicated in dotted outline in Fig. 24. Said lever operates upon pins $f^6$, secured to the pivoted plates $f^2$ and $f^3$ on the guide F, and these being now spread apart, as indicated in said figure, the shell of the button can be pushed by the thumb of the operator into the spring-arms $n^3$ of the holding-chuck $n$. When the shell has thus been inserted into this chuck, the pivoted plates $f^2$ and $f^3$ by their own weight and that of the lever $f^4$ resume their normally-closed positions; or they may be returned by means of a coiled spring $f^8$, secured between pins $f^7$ on the plates $f^2$ and $f^3$, as illustrated in Figs. 38 and 39. While the shell in the lower portion of the guide F has been hunted, as just described, and during the operation of forcing the post on the back-plate through the material, the ring $b$ has also moved one space and another shell is fed into the chute or raceway $a^6$. This shell passes along said chute and is held at the end of the chute by a pin $f^{10}$ on an arm $f^9$, secured to the guide, as shown in Fig. 23, which pin $f^{10}$ moves beneath the chute when the guide has been raised, and thus holds said shell in this position. The guide F is now free of any shell in its lower part, the shell previously held therein having been removed to the chuck $n$. In order to place said shell in the chuck $n$ over the post on the back-plate projecting through the material, the treadle $d'$ is again depressed and the chuck once more assumes the position shown in Fig. 6; but this time the shell is brought with it and its rectangular slot enters upon the post on the back-plate. At the same time the slotted punch $n^6$, which projects through the opening in the face-plate $k$ of the shell, enters upon the end of the flat post, and by means of a turn upon the handle $n^7$ the spindle $n^4$ receives a quarter-turn, and the oppositely-projecting arms of the post are twisted or bent at right angles, or approximately so, in opposite directions across the slot, as clearly shown in Fig. 35, and the button has been completed and firmly secured upon the material, which is now removed from the side of the slide G. The foot of the operator is then taken from the treadle $d'$, the several mechanisms just described return to their normal positions, (indicated in Fig. 5,) the shell held by the pin $f^{10}$ falls into the guide F and is held by the pin $l$, mentioned in the previous description. During these several operations caused by the movement of the treadle $d'$ the treadle $e$ has remained depressed, and the next back-plate and post which have been dropped upon the upper surface of the slide G have been brought into proper position by means of the hunter $h$. The operation of the machine can now be repeated—that is, the treadle $e$ is again depressed and the back-plate and post are brought forward to the position shown in Fig. 12. Then with the right foot the treadle $d'$ is depressed, and by means of the punch $n^6$ the post is forced through the material, and at the same time the pin $l$ is released, drops down into the lower part of the guide F, and is hunted. The treadle $d'$ is released, the die and pivoted guide F resume their normal positions, the shell in the guide F is forced into the chuck by the operator, treadle $d'$ again depressed, and this shell brought down upon the post of the back-plate in precisely the same manner as has just been described. From Fig. 5 it will be seen that the chute or raceway $a^5$ is held by means of a bar $a^{21}$, secured to the standard $A'$. In order to properly feed the shells contained in the pocket or receiver $A^3$ into the pivoted guide F, it will be noticed from Fig. 5 that the recesses $b^5$ on the inner surface of the ring $b$ are spaced twice as far apart as the teeth $b^6$ on said ring, which allows of the proper feeding of the shells into the pivoted guide, and whereby the chuck can perform its two operations—first, that of punching the post on the back-plate through the material and then bringing down the shell upon the post and securing it thereto. In lieu of the construction of hunter shown in Figs. 26 and 27 I can use the hunter shown in Fig. 40, in which case I dispense with the pulley $r'$ on the arm $r$, with the end $s^3$ of the cord $s'$, with the pulley $r^2$, and with the weight $s^5$, and in lieu thereof I use a coiled spring $t$. (Shown in said figure.) In this case the end of the cord $s'$ is secured in the grooved pulley $p^5$. The manner of operating the hunter is the same as that described in connection with Fig. 26; but instead of returning the same by means of the weight $s^5$ the coiled spring $t$ does the work. Instead of depending upon the weight of the pivoted shell-guide F to return the same to its normal position a cord $u$ may be secured thereto, as shown in Fig. 37, which is passed over a grooved wheel or pulley $u'$, secured to the standard $A'$, said cord being provided on its free end with a weight $u^2$. The mode of operation of the above-described devices will be clearly understood from the previous description and the annexed drawings.

By this form of machine I have devised a simple and operative device in which the back-plates and their posts are thrown in any desirable number into one receiving-pocket $A^2$ and the shells of the button are thrown in any desirable number into another pocket $A^3$, and the back-plates are fed one at a time to the proper position in the machine, the cloth or material forced down over the post upon the back-plate, and the shell of the button secured thereto, and the finished button, thus firmly attached on the material, is finally removed from the machine, and the operation of attaching another button can be repeated.

It is obvious that the precise form and arrangements of parts herein shown are not essential to my improvements, and they may be varied within the limits of mechanical skill without departing from the scope of the present invention.

Having thus described my invention, what I claim is—

1. The combination, in a machine for attaching buttons, of a base or table, a standard on said table, oppositely-arranged pockets or receivers on said standard, chutes or raceways leading from each pocket or receiver, a slide in connection with one chute, upon which the back-plate of a button is fed, devices for placing the back-plate properly on said slide, a pivoted shell-guide connected with the other chute, and a chuck for forcing the post on the back-plate through the material and placing the shell on said post, for the purposes set forth.

2. The combination, in a machine for attaching buttons, of a base or table, a standard on said table, oppositely-arranged pockets or receivers on said standard, chutes or raceways leading from each pocket or receiver, a slide in connection with one chute, upon which the back-plate of a button is fed, devices for placing the back-plate properly on said slide, a pivoted shell-guide connected with the other chute, and a chuck for forcing the post on the back-plate through the material and placing the shell on said post, and devices for properly rotating the shell in its shell-guide before being forced into the chuck, for the purposes set forth.

3. The combination, in a machine for attaching buttons, of a back-plate-holding pocket or receiver $A^2$, a chute or raceway extending therefrom, means in said receiver or pocket adapted to rotate and feed the back-plates into said chute, mechanism for operating the same, a reciprocally-moving slide and means for operating said slide, upon which the back-plates are fed one at a time, a rotary spindle adapted to engage the end of the post on the back-plate, and thereby properly place the same while on the slide, and means for rotating said spindle, for the purposes set forth.

4. The combination, in a machine for attaching buttons, of a back-plate-holding pocket or receiver $A^2$, consisting of stationary half-sections secured together by means of lugs and forming a space between said half-sections, a back-plate-conveying ring adapted to rotate between said half-sections and forming part of said pocket, said ring being provided with small holding-pockets on its inner periphery and having an outer toothed periphery, and means for operating said ring, substantially as and for the purposes set forth.

5. In a machine for attaching buttons, the back-plate-holding pocket or receiver $A^2$, consisting of half-sections secured together and forming a space between them, a back-plate-conveying ring adapted to rotate between said half-sections and forming part of said pocket, said ring being provided on its inner periphery with small holding-pockets $b^4$, having a pocket portion $b^{11}$ and an incline $b^{12}$, and means for securing each pocket to said ring, for the purposes set forth.

6. In a machine for attaching buttons, the back-plate-holding pocket or receiver $A^2$, consisting of half-sections secured together and forming a space between them, a back-plate-conveying ring adapted to rotate between said half-sections and forming part of said pocket, said ring being provided on its inner periphery with small holding-pockets $b^4$, having a pocket portion $b^{11}$ and an incline $b^{12}$, and means for securing each pocket to said ring, in combination with a reciprocating back-plate-holding slide and means for conveying the back-plate from such pockets in said ring to said slide, substantially as and for the purposes set forth.

7. In a machine for attaching buttons, the combination of a reciprocating back-plate slide with a rotary spindle adapted to engage with the end of the post on the back-plate, and means for moving said slide forward and backward, and devices for rotating said spindle, substantially as and for the purposes set forth.

8. In a machine for attaching buttons, the combination of a back-plate-holding pocket or receiver, a chute or raceway extending therefrom, mechanism for feeding the back-plates from said pocket or receiver into said chute, a slide adapted to be moved forward and backward, the lower end of said chute terminating above said slide and thereby adapted to feed a back-plate thereupon, a hunter arranged above said slide, consisting of an outer sleeve, a ring provided with inclined surfaces and a stop, a slotted spindle in said sleeve, provided with a pulley and a pin thereon adapted to move upon said inclined surfaces of said ring, and means for rotating said pulley, whereby said spindle receives a rotary up-and-down movement, substantially as and for the purposes set forth.

9. In a machine for attaching buttons, the combination of a hunter $h$, having a rising and falling and rotating slotted spindle, with means, substantially as described, for rotating said spindle while rising and falling and engaging with a stop at its highest point, consisting, essentially, of a slide provided with a pin in one side, a forked and pivoted arm for operating said slide, and a belt or cord passing over pulleys, connecting said slide with said rotating spindle, substantially as and for the purposes set forth.

10. In a machine for attaching buttons, the combination, with a base or support, of a slide G upon said support, a pivoted crank-arm $e^{10}$, a hunter $h$, arranged upon said support, having a rising and falling and rotating slotted spindle, a cord connected with said slide and passing over a pulley and around said spindle while rising and falling, and a stop $h^{14}$ to limit its upward movement, substantially as and for the purposes set forth.

11. In a machine for attaching buttons, the combination of a hunter $h$, having a rising and falling and rotating slotted spindle, with means, substantially as described, for rotating said spindle while rising and falling and engaging with a stop at its highest point, and a sliding device for carrying the back-plate from beneath said slotted spindle after it has been rotated thereby into its proper position, a pulley on said spindle, and a weighted cord passing over said pulley and a second set of pulleys and connected at one end with said sliding device, whereby when said slide moves it operates said spindle, substantially as and for the purposes set forth.

12. In a button-attaching machine, a hunter $h$, comprising therein a hollow sleeve, a ring $h^9$, having a flat surface $h^{15}$, two inclines $h^{12}$ and $h^{13}$, a stop $h^{11}$, and a slotted spindle provided with a pulley and a pin $h^{14}$, adapted to move on said surfaces $h^{12}$, $h^{15}$, and $h^{13}$ and engage with said stop, substantially as and for the purposes set forth.

13. In a machine for attaching buttons, the herein-described slide G, provided at one end with a recess or pocket $g'$, in combination with a pivoted crank-arm $e^{10}$ and stops $g^8$ and $g^9$ to limit the forward and backward movement of said slide, substantially as and for the purposes set forth.

14. In a machine for attaching buttons, the herein-described slide G, provided at one end with a pocket $g'$ and a spring-actuated sliding arm $g^4$, projecting normally above the front edge of said recess $g'$, substantially as and for the purposes set forth.

15. In a machine for attaching buttons, the herein-described slide G, provided at one end with a recess or pocket $g'$ and a spring-actuated sliding arm $g^4$, projecting normally above the front edge of said recess $g'$, and means on the bed-plate of the machine for automatically depressing said arm $g^4$ when the slide has moved forward, substantially as and for the purposes set forth.

16. In a machine for attaching buttons, the herein-described slide G, provided at one end with a recess or pocket $g'$ and a spring-actuated sliding arm $g^4$, projecting normally above the front edge of said recess $g'$, and means on the bed-plate of the machine for automatically depressing said arm $g^4$ when the slide has moved forward, and means for moving said slide forward and backward, consisting, essentially, of a pin $g^2$ in the side of said slide, a slotted and pivoted lever or arm $e^{10}$, engaging therewith, and a spring-actuated lever and treadle for operating the same, substantially as and for the purposes set forth.

17. In a button-attaching machine, in combination, a base or table, a standard $A'$ thereon, a back-plate-receiving pocket $A^2$, consisting, essentially, of half-sections $a^2$ and $a^4$, secured together and having a ring $b^2$, adapted to rotate between the same, provided with back-plate-receiving pockets and mechanism for producing a step-by-step movement of said ring, a shaft extending into said pocket $A^2$, provided with brushes for forcing the back-plates into the pockets on said ring, a reciprocatory-moving slide, a rotating hunting-spindle, and means for conveying a back-plate from the ring in the pocket $A^2$ beneath said hunting-spindle and upon the slide, substantially as and for the purposes set forth.

18. In a machine for attaching buttons, the combination, with the pocket $A^2$, of the chute or raceway $a^2$, curved double, as at $a^{20}$, whereby the back-plate which has entered said chute, with its post projecting downwardly, passes out therefrom at the bottom of the chute with the post in an upright position, substantially as set forth.

19. In a machine for attaching buttons, the back-plate-holding pocket or receiver $A^2$, consisting of half-sections having grooved flanges $a^{15}$ and $a^{16}$, lugs $a^7$ on said flanges, and bolts $a^8$ for securing them together, whereby a space is formed between said half-sections, and a back-plate-feeding ring provided with annular projections on the sides, fitting into said grooves in the flanges $a^{15}$ and $a^{16}$, thereby forming a complete pocket or receiver, with a ring adapted to rotate centrally between its half-sections, substantially as and for the purposes set forth.

20. In a machine for attaching buttons, the herein-described back-plate-feeding ring $b^2$, provided with teeth $b^8$, inclined, as at $b^9$, and straight, as at $b^{10}$, provided on its inner periphery with dovetailed portions $b^{14}$, and pockets $b^4$, having the portions $b^{13}$ secured in said dovetailed portions, substantially as and for the purposes set forth.

21. In a button-attaching machine, in combination, a base or table, a standard $A'$, a back-plate-receiving pocket $A^2$, consisting, essentially, of half-sections $a^2$ and $a^4$, secured together, a ring $b^2$, adapted to rotate between the same, provided with back-plate-receiving pockets, and mechanism for producing a step-by-step movement of said ring, a shaft extending into said pocket $A^2$, provided with brushes for forcing the back-plates into the pockets on said ring, a reciprocatory-moving slide, a rotating hunting-spindle, means for conveying a back-plate from the ring in the pocket $A^2$ beneath said hunting-spindle and upon said slide, means for moving said slide backward or forward, whereby a recess $g'$ in said slide is moved beneath said spindle and the back-plate dropped into the same, a spring-actuated rod on said slide projecting above said recess $g'$, an inclined nose-piece on said rod, and a pointed screw or pin on the bed-plate, adapted to engage with said inclined nose-piece for depressing said rod $g^4$, substantially as and for the purposes set forth.

22. The combination, in a machine for attaching buttons, of a shell-holding pocket or receiver $A^3$, a chute or raceway extending therefrom, a shell-guide pivoted to said chute or raceway, means in said receiver adapted to rotate and feed the shells into said chute, means in said pivoted guide for holding a shell therein, and a chuck for receiving a shell from said pivoted guide, substantially as and for the purposes set forth.

23. The combination, in a machine for attaching buttons, of a shell-holding pocket or receiver $A^3$, a chute or raceway extending therefrom, a shell-guide pivoted to said chute or raceway, means in said receiver adapted to rotate and feed the shells into said chute, a device in said pivoted guide for holding a shell therein, and a chuck for receiving said shell and provided with a slotted punching-spindle, substantially as and for the purposes set forth.

24. The combination, in a machine for attaching buttons, of a shell-holding pocket or receiver $A^3$, a chute or raceway extending therefrom, a shell-guide pivoted to said chute or raceway, means in said receiver adapted to rotate and feed the shells into said chute, a device in said pivoted guide for holding a shell therein, and a chuck for receiving said shell and provided with a slotted punching-spindle, and means extending through said chuck and connected with said spindle and provided with a handle $n^7$ and a weight $n^8$ for turning said spindle within the chuck, substantially as and for the purposes set forth.

25. The combination, in a button-attaching machine, of a shell-holding pocket or receiver $A^3$, consisting of half-sections secured together by means of lugs and forming a space between said half-sections, a shell-conveying ring adapted to rotate between said half-sections and forming part of said pocket, said ring being provided with shell-holding recesses, and a mutilated wheel in said pocket provided in its rim with a shell-conveying groove, said wheel having an outer toothed periphery, and means for operating said ring, substantially as and for the purposes set forth.

26. In a machine for attaching buttons, the shell-holding pocket or receiver $A^3$, consisting of half-sections secured together and forming a space between them, a shell-conveying ring adapted to rotate between said half-sections and forming part of said pocket, said ring being provided in its inner periphery with recesses $b^5$, and a stationary shell-guide in said pocket $A^3$ beneath one upper quarter portion of said ring, substantially as and for the purposes set forth.

27. In a machine for attaching buttons, the shell-holding pocket or receiver $A^3$, consisting of half-sections secured together and forming a space between them, a shell-conveying ring adapted to rotate between said half-sections and forming part of said pocket, said ring being provided in its inner periphery with recesses $b^5$, and a stationary shell-guide in said pocket $A^3$ beneath one upper quarter portion of said ring, consisting of a mutilated wheel provided with a groove in its outer rim and arranged on a stationary sleeve to one of said half-sections, substantially as and for the purposes set forth.

28. In a machine for attaching buttons, the shell-holding pocket or receiver $A^3$, consisting of half-sections secured together and forming a space between them, a shell-conveying ring adapted to rotate between said half-sections and forming part of said pocket, said ring being provided in its inner periphery with recesses $b^5$, and a stationary shell-guide in said pocket $A^3$ beneath one upper quarter portion of said ring, consisting of a mutilated wheel provided with a groove in its outer rim and arranged on a stationary sleeve to one of said half-sections, devices for operating said ring, and a shaft in said sleeve provided with brushes, receiving an oscillatory movement from said devices for operating the ring, substantially as and for the purposes set forth.

29. In a machine for attaching buttons, the standard D, provided with a spring-actuated jaw for operating said ring in the pocket $A^3$, pivoted to a rod in said standard, and means for producing an up-and-down motion of said rod, in combination with the shaft $c$, a wheel $c^5$ on said shaft, and a link connecting said wheel with a pin working in a slot $d^{12}$ in said standard D and secured to the rod therein, substantially as and for the purposes set forth.

30. The combination, in a button-attaching machine, of a shell-holding pocket or receiver $A^3$, consisting of half-sections secured together by means of lugs and forming a space between them, a shell-conveying ring adapted to rotate between said half-sections and forming part of said pocket, provided with shell-retaining recesses, and a mutilated wheel in said pocket provided in its rim with a shell-conveying groove, said ring having an outer toothed periphery, and means for operating said ring, in combination with a pivoted guide and a chute for conveying a shell from said pocket into said shell-guide, substantially as and for the purposes set forth.

31. The combination, in a button-attaching machine, of a shell-holding pocket or receiver $A^3$, consisting of half-sections secured together by means of lugs and forming a space between them, a shell-conveying ring adapted to rotate between said half-sections and forming part of said pocket, provided with shell-retaining recesses, and a mutilated wheel in said pocket provided in its rim with a shell-conveying groove, said ring having an outer toothed periphery, and means for operating said ring, in combination with a pivoted shell-guide and a chute for conveying the shell from said pocket into said shell-guide and a pivotally-secured chuck into which the shell can be forced from said guide, substantially as and for the purposes set forth.

32. In a machine for attaching buttons, in combination, a shell-holding pocket or receiver $A^3$, consisting of stationary half-sections, a shell-conveying ring adapted to rotate between said half-sections and forming a part of said pocket, provided with shell-retaining recesses, and a mutilated gear-wheel in said pocket provided in its rim with a shell-conveying groove, said ring having an outer toothed periphery, and means for operating said ring, a pivoted guide, and a chute for conveying the shells from said pocket into said shell-guide, plates pivotally secured to the back of said guide, a cam-lever for operating said plates, and a pivoted chuck adapted to be brought against the front of said shell-guide and into which a shell can be forced from said guide when said cam-lever is operated, substantially as and for the purposes set forth.

33. In a machine for attaching buttons, the combination of a shell-holding pocket or receiver, a chute or raceway extending therefrom, mechanism for feeding the shells from said pocket into said chute, a shell-guide pivoted to the lower end of said chute, means for holding a shell in the lower end of said guide, a hunter provided with a hunting-spindle, and means connected with said guide for bringing it up against said hunting-spindle, whereby said shell is properly rotated in said guide, substantially as and for the purposes set forth.

34. In a machine for attaching buttons, the combination of a shell-holding pocket or receiver, a chute or raceway extending therefrom, mechanism for feeding the shells from said pocket into said chute, a shell-guide pivoted to the lower end of said guide, a hunter provided with a hunting-spindle, and means connected with said guide for bringing it up against said hunting-spindle, whereby said shell is properly rotated in said guide, and a pivoted chuck for receiving said hunted shell, as and for the purposes set forth.

35. In a machine for attaching buttons, the shell-guide pivotally secured to the shell-conveying chute, consisting of guides or ways for feeding the shell to its lower portion and provided with pivoted plates $f^2$ and $f^3$, operated by means of a cam-lever, said plates $f^2$ and $f^3$ having pins $f^6$ thereon, and slot $f^5$ in said cam-lever, into which said pins project, substantially as and for the purposes set forth.

36. In a machine for attaching buttons, in combination, a shell-holding pocket or receiver $A^3$, consisting of stationary half-sections, a shell-conveying ring adapted to rotate between said half-sections and forming a part of said pocket, provided with shell-retaining recesses, and a mutilated gear-wheel in said pocket provided in its rim with a shell-conveying groove, said ring having an outer toothed periphery, and means for operating said ring, a pivoted guide, and a chute for conveying the shells from said pocket into said shell-guide, plates pivotally secured to the back of said guide, a cam-lever for operating said plates, a pivoted chuck adapted to be brought against the front of said shell-guide and into which a shell can be forced from said guide when said cam-lever is operated, and a shell-stop near the upper end of said shell-guide, consisting of a rod $f^9$, provided with a stop-pin $f^8$, adapted to project directly beneath the end of said shell-conveying chute to which the shell-guide is pivoted, substantially as and for the purposes set forth.

37. In a machine for attaching buttons, the shell-guide pivotally secured to the shell-conveying chute, consisting of guides or ways for feeding the shell to its lower portion and provided with pivoted plates $f^2$ and $f^3$, operated by means of a cam-lever, and a rod $f^9$, provided with a stop-pin $f^8$ on the upper front portion of the guide, in combination with a rod $l$, extending out from the standard of the machine and projecting through a hole $f'$ in the center of the shell-guide, substantially as and for the purposes set forth.

38. In a machine for attaching buttons, the herein-described shell-guide F, pivoted to the lower end of the shell-conveying chute, in combination with a plate $o$, having an inclined surface $o'$ and a reciprocating rod $m^2$, and finger $m^4$ for causing said guide to swing to the hunter and away from the chuck, substantially as and for the purposes set forth.

39. In a machine for attaching buttons, the hunter $p$, provided with a rotating spindle having a flat end $p^6$ and a grooved pulley, a reciprocating rod $m^2$, and means connecting said rod with said spindle for causing the rotary movement of the said spindle, substantially as and for the purposes set forth.

40. In a machine for attaching buttons, the hunter $p$, provided with a rotating spindle having a flat end $p^6$ and a grooved pulley, in combination with a reciprocating rod $m^2$, provided with a finger $m^5$, a cord connected with said pulley and passing through an eye on said finger $m^5$, a stop-piece $s^2$ on said cord, and a rod $s$, to which the end of said cord is attached, substantially as and for the purposes set forth.

41. In a machine for attaching buttons, the hunter $p$, provided with a rotating spindle having a flat end $p^6$ and a grooved pulley, in combination with a reciprocating rod $m^2$, provided with a finger $m^5$, a cord connected with said pulley and passing through an eye on said finger $m^5$, a stop-piece $s^2$ on said cord, and a rod $s$, to which the end of said cord is attached, a pivoted shell-guide provided with a plate $o$, having an incline $o'$, and a finger $m^4$ on said rod $m^2$, whereby said guide is brought up against the end $p^6$ of the hunting-spindle and said spindle rotates and properly places the shell in said guide, substantially as and for the purposes set forth.

42. In a machine for attaching buttons, a pivoted chuck arranged in bearings on the table or base of the machine and mechanism for operating the same, said chuck comprising therein spring-actuated jaws $n^3$, a slotted spindle, and a lever $n^7$ for turning said spindle, as and for the purposes set forth.

43. In a machine for attaching buttons, a pivoted chuck arranged in bearings on the table or base of the machine and mechanism for operating the same, said chuck comprising therein spring-actuated jaws $n^3$, a slotted spindle, and a lever $n^7$ for turning said spindle, in combination with a slide on said base of the machine, said slide having a back-plate-conveying guide and means at the end thereof for retaining said back-plate and its post in position to permit said slotted spindle to enter upon said post or stud, substantially as and for the purposes set forth.

44. In a machine for attaching buttons, a pivoted chuck arranged in bearings on the table or base of the machine and mechanism for operating the same, said chuck comprising therein spring-actuated jaws $n^3$, a slotted spindle, and a lever $n^7$ for turning said spindle, in combination with a slide on said base of the machine, said slide having a back-plate-conveying guide, a spring-actuated post $g^4$ at the end thereof, and a stop $g^9$, provided with a pointed end $g^8$ for depressing said post $g^4$, all arranged substantially as and for the purposes set forth.

45. In a machine for attaching buttons, the combination, with a ring, as $b$, provided with annular projections on its sides and rotating in grooved half-sections, of a back-plate or shell containing pocket or receiver with the mechanism for actuating the same, consisting of an upright and tubular standard secured to the table of the machine, a reciprocating rod therein, means at its lower end for actuating said rod, and a spring-actuated jaw at its upper end in normal engagement with a tooth on said ring, substantially as and for the purposes set forth.

46. In a machine for attaching buttons, the hunter $p$, consisting of a tubular sleeve $p'$, a spindle $p^4$, provided with a pulley $p^5$ and a flat end $p^6$, two pins $p^8$ on said pulley, and a pin $p^7$, projecting from the side of said sleeve, substantially as and for the purposes set forth.

47. In a button-attaching machine, the combination, with the standard A', of two pockets A² and A³, secured on opposite sides of said standard, each provided with a feeding device for feeding certain parts of a button to devices for securing them to a piece of material, a hub $c$, secured to the wall of one of said pockets, a sleeve in said hub, and a shaft in said sleeve provided with brushes extending into each of said pockets A² and A³, and means at the one end of said shaft for producing an oscillatory movement of the shaft, substantially as and for the purposes set forth.

48. In a button-attaching machine, the combination, with the standard A', of a pocket A², containing back-plates, and a pocket A³, containing shells, both secured on opposite sides of said standard, a rotary-moving ring in said pocket A² for feeding the back-plates into a chute, a slide beneath said chute and means for operating the same, and a hunting device for properly placing the back-plate and its post, a rotary-moving ring in said pocket A³ for feeding a shell into a chute, a shell-guide pivoted to said chute, and devices for hunting or rotating said shell in its guide and for removing its shell to a chuck, and mechanism for securing the shell upon the post on the back-plate and twisting the upper portion thereof, substantially as and for the purposes set forth.

49. In a machine for attaching buttons, the combination, with a standard A' and a rod or arm $r$, attached thereto, of the hunter $p$, secured to said rod and provided with a spindle, and means for rotating the same, substantially as and for the purposes set forth.

50. In a machine for attaching buttons, the combination, with a rod $r$, having a pulley $r'$, of the hunter $p$ and its spindle provided with a pulley $p^5$ and a belt or cord passing over said pulleys for operating the same, substantially as and for the purposes set forth.

In testimony that I claim the invention set forth above I have hereunto set my hand this 4th day of January, 1892.

CHARLES RADCLIFFE.

Witnesses:
FREDK. C. FRAENTZEL,
WM. H. CANFIELD, Jr.